United States Patent [19]
Nakatani et al.

[11] Patent Number: 5,577,021
[45] Date of Patent: Nov. 19, 1996

[54] OPTICAL AND MAGNETOOPTICAL RECORDING MEDIUM HAVING A LOW THERMAL CONDUCTIVITY DIELECTRIC LAYER

[75] Inventors: Kenji Nakatani; Toru Horiguchi; Junichi Ishimaru; Hiroshi Hara, all of Hino, Japan

[73] Assignee: Teijin Limited, Osaka, Japan

[21] Appl. No.: 451,156

[22] Filed: May 26, 1995

[30] Foreign Application Priority Data

| May 26, 1994 | [JP] | Japan | 6-112574 |
| Jun. 24, 1994 | [JP] | Japan | 6-143042 |
| Jun. 24, 1994 | [JP] | Japan | 6-143043 |

[51] Int. Cl.$^6$ ................................. G11B 7/24
[52] U.S. Cl. .............. 369/275.2; 369/13; 428/694 RL
[58] Field of Search .................... 369/13, 275.2, 369/288, 284, 275.1, 275.3; 360/59, 114; 428/694 SC, 694 DE, 694 RE, 694 RL, 694 MM, 696 IS

[56] References Cited

U.S. PATENT DOCUMENTS

| 5,340,647 | 8/1994 | Matsubaguchi et al. | 369/13 X |
| 5,341,349 | 8/1994 | Kagami et al. | 369/13 |
| 5,368,986 | 11/1994 | Terao et al. | 369/275.4 X |

FOREIGN PATENT DOCUMENTS

| 0368194 | 5/1990 | Germany . |
| 0406569 | 1/1991 | Germany . |
| 0449183 | 10/1991 | Germany . |
| 0482606 | 4/1992 | Germany . |
| 0503607 | 9/1992 | Germany . |
| 2156444 | 6/1990 | Japan . |
| 2156445 | 6/1990 | Japan . |
| 469834 | 3/1992 | Japan . |
| 4301243 | 10/1992 | Japan . |
| 4319551 | 11/1992 | Japan . |
| 5250740 | 9/1993 | Japan . |

*Primary Examiner*—Ali Neyzari
*Attorney, Agent, or Firm*—Sughrue, Mion, Zinn, Macpeak & Seas

[57] ABSTRACT

An optical recording medium comprises a transparent substrate, a first dielectric layer, a recording layer, a second dielectric layer and a reflecting layer stacked in this order, wherein said first dielectric layer has a thermal conduction coefficient of 0.03 to 0.1 μW/K, said second dielectric layer has a thermal conduction coefficient of 0.01 to 0.03 μW/K, and said reflecting layer has a thermal conduction coefficient of 4 to 12 μW/K, where the thermal conduction coefficient is defined as a product of the thermal conductivity and the layer thickness. The first and/or second dielectric layers may be of an amorphous metal nitride comprising Al and Si and optionally C and having bonds with hydrogen.

27 Claims, 2 Drawing Sheets

OPTICAL AND MAGNETOOPTICAL RECORDING MEDIUM HAVING A LOW THERMAL CONDUCTIVITY DIELECTRIC LAYER

BACKGROUND OF THE INVENTION

1. Field of the Invention

The present invention relates to an optical recording medium on which an energy beam such as a laser beam as an optical signal is applied to record information of images, audio information or computer data, more particularly a magneto-optical recording medium including a low thermal conductivity dielectric layer which provides a high sensitivity to a recording laser power and allows a low power and short wavelength laser beam to be used.

2. Description of the Related Art

Allowing a high recording density and a large information capacity, optical recording media have been investigated and developed in various aspects and some of them have been practically realized. Among others, a magneto-optical recording medium is known. A typical magneto-optical recording medium comprises, on a transparent substrate, a recording layer of a rare earth-transition metal amorphous alloy having an easy magnetization axis vertical to the layer surface.

The recording layer of a rare earth-transition metal amorphous alloy alone has problems such as low durability and insufficient C/N ratio (carrier information/noise ratio) in reproducing. Some solutions have been proposed to improve the above properties of the amorphous alloy recording layer. One of them provides a recording medium of a four layer structure comprising a first dielectric layer, a recording layer, a second recording layer and a metal reflecting layer on a substrate.

In these optical recording media, an energy beam such as a laser beam is applied so as to record information and the laser source often used is a semiconductor laser having a wavelength of 780 nm providing an intense energy in a small volume.

Heretofore, the so-called mark position recording method has been widely adopted which comprises formation of recording marks different in an optical characteristic in the medium, the recording marks being used to represent digital information, "0" or "1". However, along with the increase in information, an increase in recording capacity of an information recording medium is required. To attain this, use of a laser beam with a shorter wavelength, so as to shorten the length of the recording marks, to shorten the space between recording marks and to narrow the pitch between neighboring recording tracks, is required.

Replacing the mark position recording method by the mark edge recording method in which the both ends of each mark are made to correspond to the "0" and "1" of the information and which allows an about 1.5 fold increase in recording capacity has also been considered. Alternatively, so-called magnetic superresolution method has also been proposed. In this method, the recording layer used has a multi-layer structure comprising writing and reading sublayers and optionally an intermediate sublayer and others, and the difference in their thermo-magnetic property is utilized, where marks on the writing layer are partially magnetically masked by the reading layer to make finer marks readable.

Thus, increase in recording capacity or recording density requires that small marks be definitely recorded at an accurate location with a predetermined size. That is, when recorded with identical laser power, linearity between the width of the recording pulse and the length of the marks must be excellent; when recorded with an identical pulth width, the dependency of the length of the marks on the recording laser power must be small; and thermal interference between adjacent marks must be small.

Particularly in the mark edge recording method, the edges of the marks represent the information and, therefore, the accuracy of the location of the edges of the marks is severely required and the thermal interference between adjacent marks becomes an important problem. Thus, it is important to control the distribution of heat generated in the recording layer by a laser beam, in other words, the diffusion of the heat must be suppressed. It is easily consieved that the dielectric layers sandwiching the recording layer and the reflecting layer be made completely thermally insulating so that the heat is forced to act only on the recording layer. In this solution, however, prevention of the heat diffusion in the stack direction results in acceleration of the heat diffusion in the layer direction within the recording layer. Further, the recording layer is deteriorated by the heat stored there and the life of the recording medium may be shortened. It is therefore desired to control the heat transfer in both the stack and layer directions to an optimum degree.

Also in the magnetic superresolution method, reading information from narrow masked regions requires precision of the location and shape of the marks. In order to effectively utilize differences in the thermo-magnetic properties of each layer of a multi-layer structure, a medium is desired in which the temperature can easily rise to the recording temperature, but in which it will not readily rise further and the mark will not expand outward, is also desired.

It is therefore an object of the present invention to solve the above problems and provide a large capacity information optical recording medium which can be used with a shorter wavelength laser source and on which mark edge recording can be utilized.

SUMMARY OF THE INVENTION

The above and other objects of the present invention are attained by providing an optical recording medium comprising a transparent substrate, a first dielectric layer, a recording layer, a second dielectric layer and a reflecting layer stacked in this order, wherein said first dielectric layer has a thermal conduction coefficient of 0.03 to 0.1 $\mu W/K(=\mu m \times W/mk)$, said second dielectric layer has a thermal conduction coefficient of 0.01 to 0.03 $\mu W/K$, and said reflecting layer has a thermal conduction coefficient of 4 to 12 $\mu W/K$, where the thermal conduction coefficient is defined as a product of the thermal conductivity by the layer thickness In another aspect of the present invention, there is also provided a magneto-optical recording medium comprising a magneto-optical recording layer and a dielectric layer adjacent to at least one side of said magneto-optical recording layer, wherein said dielectric layer is made of an amorphous metal nitride comprising Al and Si and having bonds with hydrogen or an amorphous metal nitride comprising Al, Si and C and having bonds with hydrogen. More specifically, the amorphous metal nitride is one represented by the formula $(Si_xAl_yN_{100-x-y})_{100-a} \cdot H_a$ wherein $18 \leq 1.8y \leq x$, $55 \leq x+y \leq 80$ or $(20 \leq 100-x-y \leq 45)$ and $0 < a \leq 40$, one represented by the formula $(Si_xAl_yC_zN_{100-x-y-z})_{100-b} \cdot H_b$ wherein $18 \leq 1.8y \leq x$, $0<z \leq 40$, $15 \leq (100-x-y-z) \leq 55$ and $0<b \leq 40$, or one represented by the formula $(Si_xAl_{100-x})_uC_vN_wO_{100-u-v-w}$ wherein $0<x \leq 50$, $20 \leq v$, $0<v \leq 30$, and $0<(100-u-v-w) \leq 50$.

DESCRIPTION OF THE PREFERRED EMBODIMENTS

As described before, the mark edge recording method requires precise control of the location of the edges of marks or control of the heat distribution in a recording medium. However, the constitution of the optical recording medium is limited by the necessity of obtaining a high C/N ratio. That is, the thickness, the refractive index and the light absorption coefficient of the first and second dielectric layers, and the reflectivity and the light absorption coefficient of the reflecting layer should be optimized in relation to the light source, more specifically in relation to the wavelength of the laser beam, in order to make the laser beam converge into the recording layer and to amplify the optical signal obtained from the recording layer.

To obtain as much optical signal as possible from the recording layer, it is desirable that, in the region of the wavelength of the optical beam used, the light absorption coefficient of the dielectric layer be low, preferably close to zero, and the reflectivity of the reflecting layer be high. Also, the effect of optical interference by the first and second dielectric layers should be utilized to converge the laser beam into the recording layer and to amplify the optical signal from the recording layer (or to enhance the Faraday effect). In order to take advantage of this effect, it is necessary that the refractive indexes of the dielectric layers be 1.6 or more.

Furthermore, the manufacture of recording media is usually carried out using a vacuum process such as sputtering. In order to decrease the manufacturing cost, the throughput in a vacuum apparatus should be increased to improve the productivity, which makes thinner layers preferable.

As a result, the thicknesses of the dielectric layers converge to certain ranges, depending on the type of laser source used. For example, when the light source is a laser with a wavelength of 680 nm and the dielectric layers have a refractive index of about 2, the first dielectric layer should have a thickness of 40 to 140 nm and the second dielectric layer a thickness of 10 to 60 nm. These thicknesses depend on the light source used, as mentioned above.

Under the conditions which are determined by optical considerations, accuracy in the location of edges of marks recorded on a recording layer is the key to obtain a high capacity recording medium. In this consideration, a medium which has a heat insulating property which quickly elevates the temperature to the recording temperature, but also has a heat releasing property which prevents further elevation of the temperature is desired.

After vigorous investigation, the inventors discovered that the above desired feature is attained by using a first dielectric layer with a thermal conduction coefficient of 0.03 to 0.1 μW/K, a second dielectric layer with a thermal conduction coefficient of 0.01 to 0.03 μW/K, and a reflecting layer with a thermal conduction coefficient of 4 to 12 μW/K, where the thermal conduction coefficient is defined as a product of the thermal conductivity and the layer thickness.

Generally speaking, the dielectric layers of a medium of the present invention, particularly the second dielectric layer, are preferably made of a material having a low thermal conductivity. Conventionally, SiN, AlN, SiC and so on are used for the dielectric layers. However, these dielectric materials have a low thermal insulating property, i.e., a high thermal conductivity, for example, 3 W/mK of SiN, 24.9 W/mK of AlN and 10 W/mK of $Si_3N_4$.

The requirements of the thermal conduction coefficients of the dielectric layers, particularly the second dielectric layer, of the present invention can be attained by using, for example, a material comprising Al, Si and N with up to 30 atom % of at least one element of C, O and H. That is, a dielectric material comprising Al, Si and N is low in thermal conductivity due to lattice scattering caused by an increase in the number of the constituting elements. But if at least one element of C, O and H is added thereto, the dielectric material comprising Al, Si and N comes to have covalent bonds with the C, O and/or H and the number in the covalent bonds is limited, which blocks the thermal conduction through lattice vibrations, to thereby lower the thermal conductivity. This lowered thermal conductivity in combination with the optical and mechanical properties desired of an optical recording medium, makes it possible to attain the conditions of the thermal conduction coefficients of the dielectric layers, particularly the second dielectric layer, of the present invention.

More particularly and in accordance with another aspect of the present invention there are provided a novel dielectric layer made of an amorphous metal nitride comprising Al and Si and having bonds with hydrogen (first embodiment); a novel amorphous metal nitride comprising Al, Si and C and having bonds with hydrogen (second embodiment); and a novel amorphous metal nitride comprising Al, Si, N and O (third embodiment). The amorphous metal nitride of the first embodiment may be represented by the formula $(Si_xAl_yN_{100-x-y})_{100-a} \cdot H_a$ wherein $18 \leq 1.8y \leq x$, $55 \leq x+y \leq 80$ and $0<a \leq 40$, preferably $3<a \leq 40$, more preferably $5<a \leq 30$. The amorphous metal nitride of the second embodiment may be represented by the formula $(Si_xAl_yC_zN_{100-x-y-z})_{100-b} \cdot H_b$ wherein $18 \leq 1.8y \leq x$, $0<z \leq 40$, $15 \leq (100-x-y-z) \leq 55$ and $0<b \leq 40$, preferably $3<b \leq 40$, more preferably $5<b \leq 30$. The amorphous metal nitride of the third embodiment may be represented by the general formula $(Si_xAl_{100-x})_uC_vN_wO_{100-u-v-w}$ wherein $0<x \leq 50$, $20 \leq v$, $0<v \leq 30$, and $0<(100-u-v-w) \leq 50$. These amorphous metal nitrides and their production are described in more detail later.

Returning to the first aspect of the present invention, it is not sufficient to use a dielectric layer with a low thermal conductivity, and it is necessary to provide an optical medium having an adequate heat conduction from the recording layer to the dielectric layer to the reflecting layer. This is attained by satisfying the above-stated conditions of the thermal conduction coefficient of the dielectric layers.

Here, it is noted that when the average content of oxygen in the layer is high, it is possible to adopt a constitution in which the dielectric layer has a gradient of oxygen content so that it is low in the region adjacent to the recording layer so as to prevent oxidation of the recording layer, or has a multi-layer structure having a similar effect. In such cases, each of the dielectric layers as a whole should satisfy the range of the thermal conduction coefficients of the present invention.

The method for forming the dielectric layer may be any known method: evaporation, sputtering, CVD, and so on, with sputtering being preferred because of easy deposition of a uniform layer. The target for the sputtering may be a metal alloy, an oxide, a nitride, a carbide or the like. The atmosphere may be an appropriate mixture of a gas which is reactive in plasma, for example, nitrogen, hydrogen, oxygen, carbonate gas, carbon monooxide, nitrogen monooxide, nitrogen dioxide, methane gas, ethane gas, silicon hydride or the like with an inert gas such as Ar, Xe and Kr, so as to obtain a dielectric layer having a desired composition.

The reflecting layer with a low thermal conductivity but an increased thickness may attain effects similar to those attained by a reflecting layer with a high thermal conductivity. However, since an increase in the thickness enhances the recording sensitivity but is not effective for precisely controlling the location of marks, a less thick reflecting layer is preferable. This is because a reflecting layer with an increased thickness prevents heat release from the layer due to storage of heat in the layer. Therefore, the combination of the thermal conduction coefficients of the dielectric and reflecting layers of the present invention is necessary.

The lower limit of the thickness of the reflecting layer is about 20 nm, to obtain a sufficient optical reflectivity. The upper limit of the thickness of the reflecting layer may be determined based on the considerations of productivity and the stress caused to the layer, or the like.

The reflecting layer preferably has a high thermal conductivity, for example, 80 W/mK or more, in order to prevent an unnecessary rise in the temperature of the recording layer by releasing the heat conducted from the dielectric layer.

A preferable reflecting layer satisfying the thermal conduction coefficient of the present invention may be a layer of an alloy of at least one element selected from Al, Au, Ag and Cu with up to 10 atom % of at least one element selected from Ti, Cr, Ta, Co, Ni, Mg and Si or a multi-layer comprising layers of the above elements or any alloys thereof.

The reflecting layer may be formed by known methods such as evaporation, sputtering or the like.

The recording layer may be any thin layer which allows the use of light-induced heat for recording information. For example, a phase change type recording layer and a magneto-optical recording layer are typical. Particularly, a magneto-optical recording layer for recording, reproducing and erasing by the magneto-optical effect is preferably used. A magneto-optical recording layer may be a known rare earth-transition metal alloy layer, a multi-layer utilizing exchange coupling, or an artificial lattice multi-layer of Pt/Co, etc.

It is preferable that the recording layer have a thermal conductivity of 5 to 20 W/mK for the thermal conduction in the recording layer. Most preferably, the recording layer comprises a rare earth-transition metal alloy recording layer, which has a thickness of less than 200 nm, whether it be a single layer or a multi-layer.

Typically, the optical medium further comprises a protecting layer over the reflecting layer in order to improve the durability. The provision of the protecting layer may effect the thermal property of the medium and, therefore, the protecting layer preferably has a high thermal insulating property or a low thermal conductivity, as a layer of an organic material. The preferred thermal conductivity of the protecting layer is 0.2 W/mK or less and the thickness is preferably 5 to 10 μm.

The substrate may be any known one which is transparent to a laser beam and has a low birefringense, for example, a substrate of polycarbonate resin or glass. The thermal conductivity of the substrate is usually low, 0.2 W/mK or less.

In another aspect of the present invention, there is also provided a magneto-optical recording medium comprising a magneto-optical recording layer and a dielectric layer adjacent to said magneto-optical recording layer on at least one side thereof, wherein said dielectric layer is made of one of an amorphous metal nitride comprising Al and Si and having bonds with hydrogen (first embodiment); an amorphous metal nitride comprising Al, Si and C and having bonds with hydrogen (second embodiment); and an amorphous metal nitride comprising Si, Al and C (third embodiment).

More particularly, as described before, the present inventors have investigated to provide a dielectric layer with a low thermal conductivity and excellent optical and mechanical properties, in order to cope with increases in recording capacity and speed. With such a dielectric layer, a magneto-optical recording medium can have increased recording sensitivity, reduced dependency of the recording sensitivity on the disc rotation speed, improved precision of the location of the edges of recording marks suitable to the edge recording method, etc.

The amorphous metal nitride of the first embodiment may be represented by the formula $(Si_xAl_yN_{100-x-y})_{100-a} \cdot H_a$ wherein $18 \leq 1.8y \leq x$, $55 \leq x+y \leq 80$ and $0 < a \leq 40$, preferably $3 < a \leq 40$, more preferably $5 < a \leq 30$. The amorphous metal nitride of the second embodiment may be represented by the formula $(Si_xAl_yC_zN_{100-x-y-z})_{100-b} \cdot H_b$ wherein $18 \leq 1.8y \leq x$, $0 < z \leq 40$, $15 \leq (100-x-y-z) \leq 55$ and $0 < b \leq 40$, preferably $3 < b \leq 40$, more preferably $5 < b \leq 30$. The amorphous metal nitride of the third embodiment may be represented by the formula $(Si_xAl_{100-x})_uC_vN_wO_{100-u-v-w}$ wherein $0 < x \leq 50$, $20 \geq u$, $0 < v \leq 30$, and $0 < (100-u-v-w) \leq 50$.

In the amorphous metal nitrides of the first and second embodiments, when hydrogen is added to an AlSiN layer, hydrogen atoms bond to other atoms in the layer to terminate some bonding hands of the other atoms, particularly metal atoms. This slows the propagation of lattice vibration and lowers the thermal conductivity. Termination of bonds of metals is particularly effective for this. The lowering of the thermal conductivity results in reduced diffusion of the thermal energy supplied by an applied laser to the metal reflecting layer, so that the temperature of the recording magnetic layer can be effectively increased. As a result, the laser power for recording can be lowered, the recording sensitivity improved, and the dependency of the recording sensitivity on the rotation speed of a disc reduced.

The AlSiN with covalent bonds to hydrogen is hereinafter referred to as AlSiN:H. The method for producing a layer of AlSiN:H and the properties of the layer are described below.

An AlSiN:H layer can be obtained by a known sputtering method in which a target of an AlSi alloy or a complex target of Al chips on a Si target is used and deposition is conducted in an atmosphere of a mixture of a hydrogen gas, an inert gas and a nitrogen gas. Alternatively, Al and Si targets are co-sputtered in the above atmosphere. Further, sputtering may be conducted using an AlSiN target in an atmosphere of a mixture of a hydrogen gas and an inert gas.

To control the refractive index of the dielectric layers, to lower the dependency of the magneto-optical recording medium on the rotation speed of a disc, and to improve the recording sensitivity, the composition, the flow rate and the pressure of the gases, the applied power during sputtering may be adequately selected to match the desired values of the above parameters. For example, in Examples 1 to 10 and Comparative Examples 1 to 7, deposition conditions were selected such that the flow rate of Ar gas was 27 to 49 cm$^3$/min, that of H$_2$ 0 to 40 cm$^3$/min, the total pressure was 0.73 to 1.6 Pa and the supplied power was 300 to 600 W. Incidentally, it was confirmed by the X-ray diffraction that the AlSiN:H layers deposited under these conditions were amorphous.

The refractive index of the AlSiN:H layers deposited by the above method is in the range of 1.6 to 2.5. It is preferred that the refractive index of the AlSiN:H layers be 1.8 to 2.5. The light absorption coefficient of the AlSiN:H layers measured from the light transmittance is 0.02 or less. It is preferred for a magneto-optical recording medium that the refraction coefficient of the AlSiN:H be 0.01 or less.

Infra-red absorption analysis on the AlSiN:H layer deposited with varied hydrogen gas pressure was conducted and it was found from the change of the peak intensity that as the partial pressure of the hydrogen gas increases, the number of the N—H bonds in the AlSiN:H layer increases, the number of the Si—H bonds only slightly increases and the number of the Al—H bonds hardly increases. Accordingly, an increase in the atom ratio of Si to Al in the composition of the layer is preferable to increase the number of bonds of metals with hydrogen in the layer: It is, however, preferred that the layer contains 10 atom % or more of Al in AlSiN in order to control the relative mechanical strength between AlN and SiN or to prevent propagation of cracks.

In this consideration, when the dielectric layer is represented by the formula $(Si_xAl_yN_{100-x-y})_{100-a} \cdot H_a$, it is preferred that $y \geq 10$ for Al and $x \geq 1.8y$ for Si, based on Auger electron spectrometry (AES) results. That is, $18 \leq 1.8y \leq x$, is preferred.

The content of nitrogen may be desirably reduced to prevent a reduction in the strength of the layer which may be caused by an excess of N—H bonds, and to accelerate formation of Si—H bonds. Also the content of nitrogen should ensure a high transparency of the layer obtainable by bonds between nitrogen and metals, to reduce the light absorption coefficient to 0.02 or less and to maintain the high density of the nitride layer. To attain these conditions, the proportion of nitrogen in the composition excluding hydrogen is preferably between 20% and 45%, that is, $55 \leq x+y \leq 80$ is preferred.

The desired effect of the present invention increases with the content of hydrogen. It is therefore preferable that the content of hydrogen be more than 3 atom %, more preferably more than 5 atom %. On the other hand, if the content of the hydrogen in the layer is excessive, the density of the layer may be undesirably reduced, and the strength of the layer may be reduced due to excess termination of bonds by hydrogen, which makes the protecting property of the dielectric layers insufficient. Thus, $3 < a \leq 40$ is preferred, with $5 < a \leq 30$ being more preferable.

The content of hydrogen in the layer may be determined by the absorption peaks of Si—H (around 2100 cm$^{-1}$) and N—H (around 3300 cm$^{-1}$) in FT-IR (Fourier-Transform Infra-Red Spectroscopy). For example, an AlSiN:H layer with a fixed thickness is deposited on a single crystal substrate and the IR absorptions for Si—H and N—H bonds are determined through the transmittance measurements. The analyzer may be, for example, a FT-IR analyzer, JIR40X manufactured by Nippon Denshi K.K.

The second amorphous metal nitride, i.e., AlSiCN having covalents with hydrogen, is hereinafter referred to as AlSiCN:H. The method for producing a layer of AlSiCN:H and the properties of the layer are described below.

An AlSiCN:H layer can be obtained by a known sputtering method in which a target of an AlSi alloy or a complex target of Al chips on a Si target is used and deposition is conducted in an atmosphere of a mixture of a hydrocarbon gas, an inert gas and a nitrogen gas. Alternatively, Al and Si targets may be co-sputtered in the above atmosphere. Further, sputtering may be conducted using an AlSiC target in an atmosphere of a mixture of a hydrogen gas, a nitrogen gas and an inert gas.

The composition, the flow rate and the pressure of the gases, and the applied power during sputtering may be adequately selected to match the desired values of the above parameters, to control the refractive index of the dielectric layers, to reduce the dependency of the magneto-optical recording medium on the disc rotation speed, and to improve the recording sensitivity. In Examples 15 to 21, CH$_4$ gas was used as a hydrocarbon gas but other hydrocarbon gases may be used to obtain similar effects. In the Examples, the flow rate of Ar gas was 24 to 54 cm$^3$/min, that of N$_2$ 3 to 9 cm$^3$/min, that of the CH$_4$ 10 to 30 cm$^3$/min, the total pressure was 1.1 to 1.6 Pa, and the supplied power was 300 to 600 W, and it was confirmed by the X-ray diffraction that the AlSiCN:H layers deposited were amorphous.

The refractive index of the AlSiCN:H layers deposited by the above method is in a range of 1.6 to 2.5. It is preferred that the refractive index of the AlSiCN:H be 1.8 to 2.5. The light absorption coefficient of the AlSiCN:H layers measured from the light transmittance is 0.04 or less. It is preferred for a magneto-optical recording medium that the absorption coefficient of the AlSiCN:H be 0.02 or less.

The content of nitrogen may be desirably reduced to prevent a reduction in the strength of the layer which may be caused by an excess of N—H bonds, and to accelerate formation of Si—H bonds. Also the content of nitrogen should ensure a high transparency of the layer obtainable by bonds between nitrogen and metals, to reduce the light absorption coefficient to 0.02 or less, and to maintain the density of the nitride layer. To attain these conditions, the proportion of nitrogen in the composition excluding hydrogen is preferably between 15% and 55%, that is, $15 \leq (100-x-y-z) \leq 55$ is preferred.

The desired effect of the invention increases with the content of hydrogen. It is therefore preferable that the content of hydrogen be more than 3 atom %, more preferably more than 5 atom %. On the other hand, if the content of the hydrogen in the layer is excessive, the density of the layer may be undesirably reduced and the strength of the layer may be reduced due to excess termination of bonds by hydrogen, which makes the protecting property of the dielectric layers insufficient. Thus, $3 < b \leq 40$ is preferred, with $5 < b \leq 30$ being more preferable.

The content of hydrogen in the layer may be determined by the absorption peaks of Si—H (around 2100 cm$^{-1}$), N—H (around 3300 cm$^{-1}$) and C—H (around 2900 cm$^{-1}$) in FT—IR, as described before.

The contents of Al, Si and C in the layer are so selected to obtain a desired effect and $18 \leq 1.8y \leq x$ and $55 \leq x+y \leq 80$ are preferred.

The third amorphous metal nitride is hereinafter referred to as AlSiCNO.

This AlSiCNO layer may be deposited by a known sputtering method using an AlSi alloy target or a composite target of Al chips on a Si target in a mixed gas atmosphere of corbon oxide, inert gas and nitrogen gas. Alternatively, co-sputtering Si and Al targets in the same atomosphere as above may be adopted. Further, sputtering an AlSiC alloy target in a mixed gas atmosphere of nitrogen oxide and inert gas may be adopted.

In the sputtering, the composition of the atmospheric gases, the flow rate of the gases, the pressure, and the applied power may be selected so as to obtain desired values of the refractive index of the dielectric layer and the recording sensitivity of the magneto-optical recording medium.

The dielectric layer thus deposited may have a refractive index of 1.6 to 2.5. It is however preferable that the refractive index be 1.8 to 2.5 from the view points of the layer density for the durability and the optical properties. The dielectric layer deposited as above may have a laser light absorption of less than 0.04, with the absorption of less than 0.02 being preferred.

To adjust the refractive index to the above preferred range, it is preferred that the content of Al and Si be 20 atom % or more and the content of C be 30 atom % or less. That is, it is preferred that $20 \leq u$ and $0 < v \leq 30$ in $(Si_xAl_{100-x})_uC_vN_wO_{100-u-v-w}$.

It is also preferred to introduce bonds of metals with N and O, so as to maintain the transparency, suppress the absorption coefficient to 0.02 or less and maintain the density of a layer as a oxynide layer. For this purpose, it is preferred that the content of N be 55 atom % or less and the content of O be 50 atom % or less. That is, it is preferred that $0 < v \leq 30$ and $0 < (100-u-v-w) \leq 50$ in $(Si_xAl_{100-x})_uC_vN_wO_{100-u-v-w}$.

To obtain the effects of the present invention, the ratio of Al to Si contents is preferably 50 atom % or less. That is, it is preferable that $0 < x \leq 50$ in the above formula.

As technology for improving the magneto-optical recording characteristics of a medium in a low external magnetic field, there are proposed a bilayered magneto-optical recording layer to improve the magnetic field sensitivity, a method of keeping a magneto-optical recording layer in an oxygen atomsphere after it is deposited, etc.

The method of improving the magneto-optical recording characteristics of a medium in a low external magnetic-field by using a specific dielectric material for the second dielectric layer, in accordance with the present invention, is preferable to the methods proposed above because of its low manufacturing cost and high productivity. Although there is a technique close to the above using SiCON as the second dielectric layer, use of the dielectric material of AlSiCNO is preferable for obtaining a recording medium used in a low external magnetic field, when the mechanical strength of the layer and the durability of the medium are considered.

The oxygen content at the interface between the recording layer and the dielectric layer is critical to improve the magneto-optical recording characteristics of the medium in a low external magnetic field. To control the above oxygen content, selection of oxygen source used, control of the amount of oxygen in the sputtering atmosphere and control of the amount of oxidized rare earth metal (Tb) in the recording layer are required.

The oxygen source used may be $O_2$, $O_3$, $CO_2$, CO, NO, $NO_2$, etc., and an oxygen source gas having a large oxygen release energy can be used to control the amount of the oxygen in the atmosphere so as to control the oxygen content at the interface of the recording layer and the dielectric layer. In accordance with the present invention, an optimum oxidization of rare earth (Tb) at the interface was obtained by using CO as an oxygen source. The amount of oxydized rare earth metal at the interface was measured by the method proposed by M. Hirasaka et al. (J. Vac. Sci. Technol. A11,503 (1993)). That is, the ratio of the intensity of the peaks (AES peaks) for Tb $(I_{134eV}/I_{115eV})$ by Auger electron microscopy (AES) is used as an indication of the oxydation of the recording layer at the interface thereof.

Figure 3:
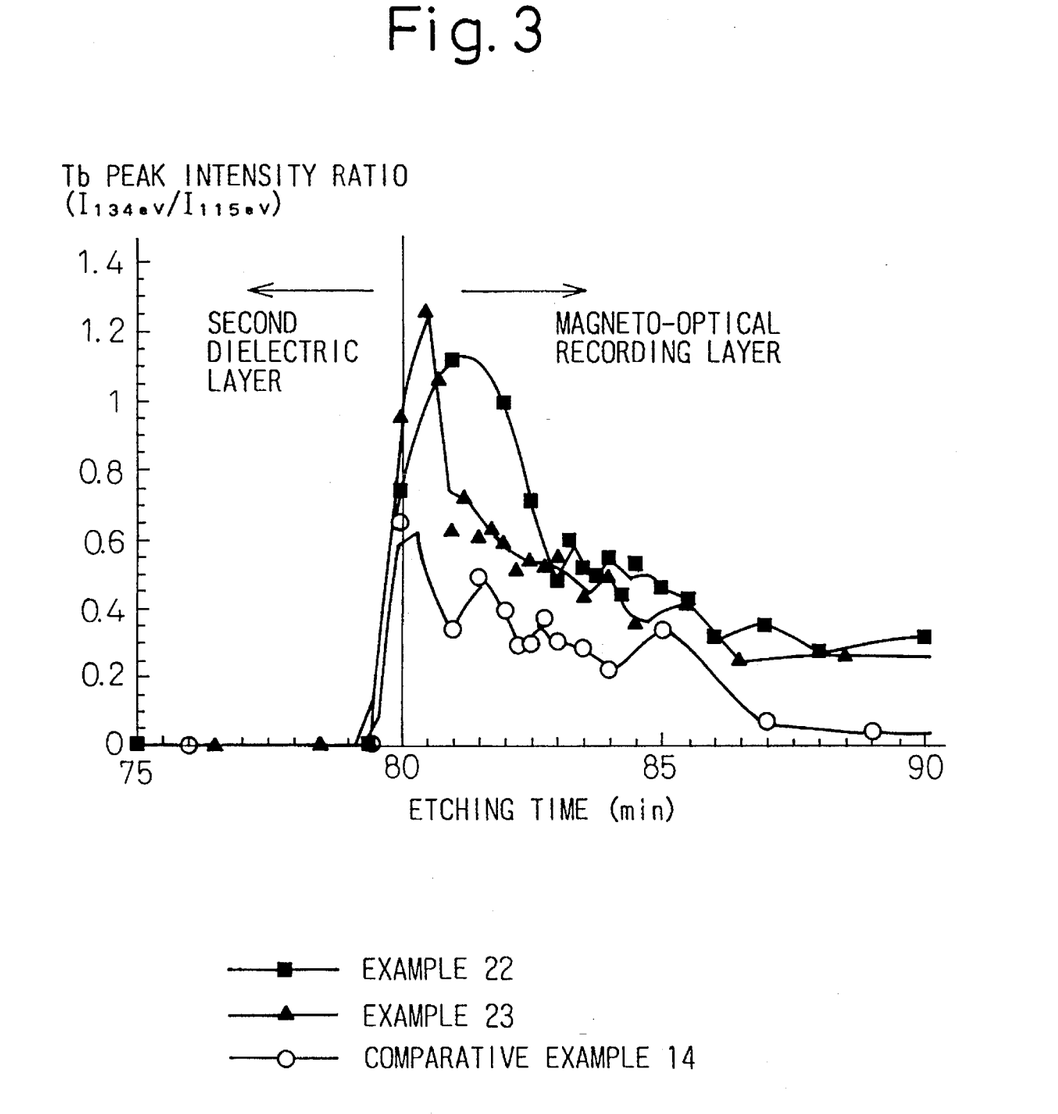
FIG. 3 shows the intensity ratio of Tb peaks $I_{135eV}/I_{115eV}$ as an indication of the oxidation of the recording layer at the interface.

FIG. 3 shows the intensity ratio of Tb peaks $I_{134eV}/I_{115eV}$. AS seen in FIG. 3, it is possible to control the oxygen content at the interface by using the second dielectric layer of AlSiCNO, so that desired magnetic field sensitivity characteristics can be obtained. It is preferable that the ratio of Tb peak intensity $I_{134eV}/I_{115eV}$ as an indication of the oxygen content of the recording layer at the interface is 0.8 to 2.0. If the oxygen content of the second dielectric layer is increased, the transparency and the density of the dielectric layer are lowered as well as the recording layer is oxidized to lower the C/N ratio. Therefore, it is preferable that the oxygen content in the dielectric layer be 50 atom % or less and the intensity ratio $I_{134eV}/I_{115eV}$ of Tb as indication of oxygen content at the inferface be 2.0 or less.

It was also found that use of SiAlCNO improves the recording sensitivity of a magneto-optical recording medium, as seen in the Examples. This is derived by reduced thermal conductivity, as a result of hinderance of heat conduction between atoms by addition of C and O atoms.

Therefore, in accordance with this embodiment of the present invention using the dielectric material of SiAlCNO, there is provided a magneto-optical recording layer which has a high sensitivity to the recording laser power, allows use of a low output laser, even a short wavelength laser, and is suitable for a high capacity recording using the edge recording, etc.

In the second aspect of the present invention, each layer of the medium may be as described above for the first aspect of the present invention, but also the following may be preferably adopted.

The dielectric layer, particularly the first dielectric layer may not be made of SiAlN:H, SiAlCN:H or SiAlCNO. The first dielectric layer is preferably made of a material having a high refractive index, $n \geq 1.6$, more preferably $n \geq 1.8$. Such a dielectric material may be AlN, AnS, $Si_3N_4$, AlSiN, SiO, $Zr_2O_3$, $In_2O_3$, $SnO_2$, $Ta_2O_5$, AlON, SiON, ZrON, InON, SnON<TaON or a mixture thereof. $Si_3N_4$, AlSiN, $Zr_2O_3$, $Ta_2O_5$, ZrON and TaON are preferable for their high refactive index of 1.8 or more and AlSiN is particularly preferable for its durability. Of course, both the first and second dielectric layers may be any of SiAlN:H, SiAlCN:H and SiAlCNO.

The substrate may be an organic material such as polycarbonate resins, acrylic resins, epoxy resins, 2-methylpentene resins, polyolefine resins and copolymers thereof. Among others, polycarbonate resins are preferable from the viewpoints of mechanical strength, durability, thermal resistance, humidity permeation and cost. It is more preferable from the viewpoint of productivity that the substrate be entirely made of a polycarbonate.

The material of the magneto-optical recording layer may be any one which can record, reproduce and erase information by the magneto-optical effect. More specifically, it may be any one which has an easy magnetization axis vertical to the layer and can have magnetic domains where inversion of the magnetization can be effected so that recording, reproducing and erasing can be done by the magneto-optical effect.

For example, the recording layer may be an amorphous alloy layer of rare earth and transition metal elements such as TbFe, TbFeCo, GdTbFe, NbDyFeCo, NbDyTbFeCo, NbFe, PrFe and CeFe; a bilayer thereof utilizing the exchange coupling; a layer having an artificial lattice multilayer structure such as Co/Pt and Co/Pd; and a CoPt-based alloy layers. These recording layer may further contain up to about 10 atom % of at least one other element as long as the vertical magnetic anisotropy of the layer is not lost. For example, one or more of rare earth and other elements except for Fe and Co, such as Ti, Zr, Hf, V, Nb, Ta, Cr, Mo, W, Tc, Re, Ru, Os, Ir, Si, Ge, Bi, Pd, Au, Ag, Cu and Pt may be contained. It is preferable to add at least one of Ti, Zr, Hf, Ta, Cr and Re to prevent corrosion by oxidation of the recording layer.

A magneto-optical recording layer of an amorphous rare earth-transition metal alloy containing Tb is advantageous since it may have a high vertical easy magnetization axis, which allows it to cope with a higher recording capacity, i.e., further miniaturization of the recording mark.

The reflecting layer may be any one made of Ag, Au, Al, Cu, etc. and alloys thereof, but preferably it has a reflectivity higher than that of the recording layer, for a laser light from a drive head used for the common C/N evaluation. Specifically, it is preferred to select such material so that the optical constants of the refractive index n and the extinction coefficient k at the laser wavelength used are $n \leq 3.5$ and $k \geq 3.5$, more preferably $n \leq 2.5$ and $4.5 \leq k \leq 8.5$. In a medium with a reflecting layer satisfying these conditions, it is expected that the C/N ratio will be further improved by increasing the reflectivity of the reflecting layer, and therefore increasing the Kerr enhancement effect.

The materials satisfying the above conditions include Al or Ag alloys with Au, i.e., AlAu alloys and AgAu alloys. To prevent reduction of the reflectivity of the reflecting layer to less than 2% of that of an Al or Au single metal layer in order to prevent reduction of C/N ratio, it is preferable that the Au content be 0.5 to 15 atom %, more preferably 0.5 to 10 atom %.

Reducing the Au content is important for lowering the cost of the target and the recording medium. Supplemental addition of at least one element selected from the specific group of Ti, Zr, Hf, V, Nb, Ta, Cr, Mo, W, Tc, Re, Ru, Os, Ir and so on to the AlAu and AgAu alloys is preferred to minimize the Au content.

The addition of the above specific elements should be not more than 5 atom %. If the addition is excessive, the reflectivity of the metal reflecting layer is lowered and the C/N is also lowered. When the amount of the added specific elements is within 5 atom %, the reduction of the reflectivity of the metal reflecting layer for a 830 nm laser beam from a semiconductor laser used in a magneto-optical recording apparatus can be not more than 2%. If the addition is less than 0.3 atom %, the effect of compensating the reduced thermal conductivity caused by reduction of the amount of the added Au cannot be expected. Accordingly, when the above specified elements are added and the amount of added Au is in the range of 0.5 to 10 atom %, the reduction of the reflectivity of the reflecting layer can be not more than 2% in comparison with that of an Al or Ag single metal layer, and the cost for the reflecting layer can be reduced.

From the viewpoint of improving the durability of the metal reflecting layer, among the above specific elements, Ti, Zr, Hf, Ta, Cr and Re are preferable. The metal reflecting layer generally has a thickness of 10 to 500 nm but is preferably 30 to 200 nm, more preferably 40 to 100 nm in order to prevent reduction of the C/N due to reduction of the reflectivity and to alloy recording at a laser power of 10 mW.

A protecting layer, particularly an organic protecting layer may be provided over the metal reflecting layer. The organic protecting layer may be light- and/or heat-setting resins or thermoplastic resins and can be formed by coating, etc. A protecting layer may be also provided on the rear surface of the medium which preferably extends to cover the sides of the medium.

The inorganic layers of the transparent dielectric layers, the recording layer and the metal recording layer may be formed by any known method, for example, PVD such as evaporation and sputtering and CVD, etc. However, a method which provides a layer strongly adhered to a resin substrate to prevent peeling of the deposited layer at a high temperature and high humidity environment is preferably adopted. In this sense, sputtering is preferred.

It is noted that the above specific amorphous nitride layer of the second aspect of the present invention may be used in connection with not only a magneto-optical recording medium but also other optical recording media such as a phase change-type optical recording medium.

It should also be noted that the combination of the first and second aspects of the present invention can be adopted and is particularly preferable.

EXAMPLES

Examples 1 to 7

Figure 1:
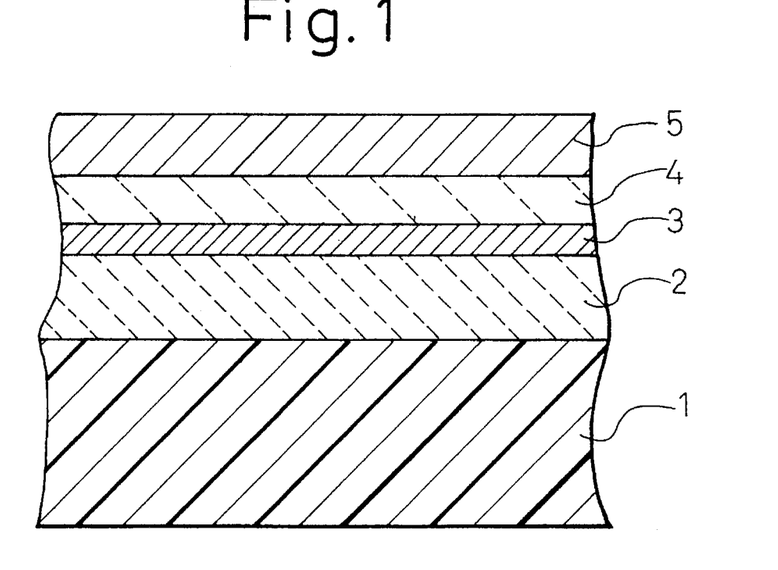
FIG. 1 shows a cross-section of a typical magneto-optical recording medium.

Referring to FIG. 1, a disc substrate 1 of a polycarbonate resin (PC substrate) having a diameter of 90 mm and a thickness of 1.2 mm and provided with 1.2 μm pitch grooves was mounted in a vacuum chamber of a magnetron sputtering apparatus (ANELVA SPF-430H type) in which three targets could be set. The target for a dielectric layer was a disc of a sintered AlSi body with a diameter of 100 mm and a thickness of 5 mm. The target for a recording layer was a TbFeCo (19:72:9) alloy target. The target for a reflecting layer was a AlAu (98:2) alloy target. The above and other ratios between the elements of the alloy compositions are in atom % in the order of the successive elements in the formulae.

The vacuum chamber was first evacuated to an inside pressure of 50 μPa, followed by introducing a mixed gas of Ar/N$_2$ (Ar:N$_2$=90:10 in vol %) and adding 20 vol % of hydrogen gas to the Ar/N$_2$ mixed gas to adjust the inside pressure to 1.33 Pa.

While the substrate 1 was rotated, sputtering was conducted under the conditions of the discharge electric power of 500 W and a discharge frequency of 13.56 MHz to deposit a first dielectric layer 2 of AlSiN:H 70 nm thick on the PC substrate 1. The AlSiN:H layer was analyzed with an Auger electron spectrometer (SAM610 by PHI Corp.) and FT-IR spectrometer (by Shimazu Seisakusho) to contain hydrogen in an amount of 12 atom %.

Next, DC sputtering was conducted using a TbFeCo target under the conditions of an Ar gas pressure of 0.5 Pa and a discharge power of 150 W to deposit an amorphous alloy layer of TbFeCo (20.5:70.9:8.6) 22.5 nm thick as a magneto-optical recording layer 3.

Next, a second dielectric layer 4 of AlSiN:H 20 nm thick was deposited in the same manner as for the first dielectric layer 2 except for the thickness.

Then, DC sputtering was conducted using an AlAu target under the conditions of an Ar gas pressure of 0.2 Pa and a discharge power of 125 W to deposit an AlAu alloy layer 40 nm thick as a reflecting layer 4. The content of Au in the deposited layer was 2.2 atom %.

The obtained magneto-optical recording media were evaluated with a magneto-optical recording and reproducing apparatus DDU-1000, sold by Pulse-Tec Industry, under the following conditions to measure the recording and reproducing characteristics of the media and determine, by the dependency of the length of recording marks on the laser power, the change of length of recording marks when the laser power was varied.

The wavelength of the laser used: 680 nm. NA (number of aperture): 0.55. The conditions of recording were as follows: Disc rotation speed: 3000 rpm; position of recording track: 30 mm radius; minimum length of recording mark T: 0.34 μm; applied magnetic field during recording: 250 Oe; pattern of recording signal: 2T(M), 8T(S), 4T(M), 8T(S), 8T(M), 8T(S), where S stands for a space and M stands for a mark. The conditions for reproducing were as follows: rotation speed of disc: 3000 rpm; laser power for reading: 0.6 mW.

The change of length of mark is defined as (8T−8L)/T× 100 in %, wherein the laser power is varied to measure the dependency of the length of the reproducing marks 4L and 8L from marks 4T and 8T on the laser power, and the laser power Pw was set so as to attain 4T=4L, and the length of the reproducing mark 8L from the mark 8T is determined at that laser power. Table 1 shows the change of length of mark when the laser power Pw is varied by 10%. As the change of length of mark is smaller, the change of the edges of the recording mark will also become smaller.

The thermal conductivity of the dielectric layers and the reflecting layer was determined by separately depositing each layer on a quartz thin plate in a thickness of a few micrometers and using a thin film thermal conductivity measuring apparatus, sold by Shinkuriko. The thermal conduction coefficient of each layer obtained by multiplying the measured thermal conductivity by the thickness of the layer is shown in Table 1.

Comparative Examples 1 to 7

Magneto-optical recording media were manufactured in the same manner as in Examples 1 to 7 except that the dielectric layers were an AlSiN layer deposited without adding hydrogen gas, and the reflecting layer was an AlAuTi layer 40 nm thick deposited using a target of AlAuTi (92.0:4.8:3.2), the total content of Au and Ti in the deposited AlAuTi layer being 11 atom %. The evaluations were conducted in the same manner as in Examples 1 to 7 and the results are shown in Table 1.

It is seen from Table 1 that when the combination of the dielectric and reflecting layers having the thermal conduction coefficients of the present invention is used, the change of the length of the marks depending on the change of the laser power is low so that the media are suitable to the edge recording method. If only the change of the length of marks is considered, it is better that the thermal conductivity is lower, but since reduction of the thermal conductivity of the dielectric material is limited, the thickness of the layer should be reduced. However, the lower limit of the thickness of the dielectric layers is determined by the optical characteristics. The upper limits of the dielectric layers are determined by the mechanical properties of the layers such as layer stress. The suitable thicknesses are 40 to 140 nm for the first dielectric layer and 10 to 60 nm for the second dielectric layer.

TABLE 1

| | 1st dielectric layer | | | 2nd dielectric layer | | | Reflecting layer | | | | |
| --- | --- | --- | --- | --- | --- | --- | --- | --- | --- | --- | --- |
| | Thermal conductivity W/m·K | Thickness nm | Thermal conduction coefficient μm·W/m·K | Thermal conductivity W/m·K | Thickness nm | Thermal conduction coefficient μm·W/m·K | Thermal conductivity W/m·K | Thickness nm | Thermal conduction coefficient μm·W/m·K | Change of length of mark % | Remarks |
| Com. Ex. 1 | 1 | 20 | 0.02 | 1 | 20 | 0.02 | 150 | 40 | 6 | 22 | 1st dielectric layer is outside the range. Poor optical characteristics due to low thickness. |
| Example 1 | 1 | 40 | 0.04 | 1 | 20 | 0.02 | 150 | 40 | 6 | 25 | |
| Example 2 | 1 | 70 | 0.07 | 1 | 20 | 0.02 | 150 | 40 | 6 | 33 | |
| Example 3 | 2 | 50 | 0.1 | 1 | 20 | 0.02 | 150 | 40 | 6 | 36 | |
| Com. Ex. 2 | 2 | 65 | 0.13 | 1 | 20 | 0.02 | 150 | 40 | 6 | 48 | 1st dielectric layer is outside the range. Large change of mark length. |
| Com. Ex. 3 | 1 | 70 | 0.07 | 1 | 5 | 0.005 | 150 | 40 | 6 | 30 | 2nd dielectric layer is outside the range. Poor optical characteristics due to low thickness. |
| Example 4 | 1 | 70 | 0.07 | 1 | 10 | 0.01 | 150 | 40 | 6 | 30 | |
| Example 5 | 1 | 70 | 0.07 | 1 | 30 | 0.03 | 150 | 40 | 6 | 35 | |
| Com. Ex. 4 | 1 | 70 | 0.07 | 2 | 25 | 0.05 | 150 | 40 | 6 | 42 | 2nd dielectric layer is outside the range. Large change of mark length. |
| Com. Ex. 5 | 1 | 70 | 0.07 | 1 | 20 | 0.02 | 50 | 40 | 2 | 48 | Reflecting layer is outside the range. Large |

TABLE 1-continued

|  | 1st dielectric layer | | | 2nd dielectric layer | | | Reflecting layer | | | | |
| --- | --- | --- | --- | --- | --- | --- | --- | --- | --- | --- | --- |
|  | Thermal conductivity W/m. K. | Thickness nm | Thermal conduction coefficient μm. W/m. K. | Thermal conductivity W/m. K. | Thickness nm | Thermal conduction coefficient μm. W/m. K. | Thermal conductivity W/m. K. | Thickness nm | Thermal conduction coefficient μm. W/m. K. | Change of length of mark % | Remarks |
| Example 6 | 1 | 70 | 0.07 | 1 | 20 | 0.02 | 100 | 40 | 4 | 39 | change of mark length. |
| Example 7 | 1 | 70 | 0.07 | 1 | 20 | 0.02 | 150 | 73 | 11 | 24 |  |
| Com. Ex. 6 | 1 | 70 | 0.07 | 1 | 20 | 0.02 | 150 | 100 | 15 | 22 | Reflecting layer is outside the range. Stress and strain are large due to large thickness. |
| Com. Ex. 7 | 2 | 70 | 0.14 | 2 | 20 | 0.04 | 40 | 40 | 1.6 | 58 | All layers are outside the ranges. Large change of mark length. |

Example 8

The magneto-optical recording medium of this example has the construction as shown in FIG. 1, i.e., transparent substrate/first dielectric layer/magneto-optical recording layer/second dielectric layer/metal reflecting layer. The second dielectric layer has the role of preventing heat diffusion from the recording layer to the metal reflecting layer.

A disc substrate of a polycarbonate resin (PC substrate) having a diameter of 90 mm and a thickness of 1.2 mm and provided with 1.6 μm pitch grooves was mounted in a vacuum chamber of a magnetron sputtering apparatus in which three targets could be set. The vacuum chamber was preliminarily evacuated to an inside pressure of 40 μPa. The substrate was rotated at 30 rpm in the later deposition steps.

First, a first dielectric layer of AlSiN 120 nm thick was deposited by RF magnetron sputtering. The target was a disc of an AlSi alloy. A mixed gas of Ar/N$_2$ (Ar:N$_2$=70:30 in vol %) was introduced into the chamber as an atmosphere gas and the inside pressure in the chamber was adjusted to 0.73 Pa by controlling the flow rate of the gas. The supplied power was 600 W at a discharge frequency of 13.56 MHz.

Next, a magneto-optical recording layer of TbFeCo 20 nm thick was deposited by RF magnetron sputtering. The target was a TbFeCo alloy. Pure Ar gas (99.999% purity) was introduced into the chamber as an atmosphere gas and the inside pressure in the chamber was adjusted to 0.27 Pa by controlling the flow rate of the gas. The supplied power was 200 W at a discharge frequency of 13.56 MHz.

Further, a second dielectric layer of AlSiN:H 50 nm thick was deposited by RF magnetron sputtering. The target was the same AlSi alloy as used for the first dielectric layer. A mixed gas of Ar/N$_2$ (Ar:N$_2$=70:30 in vol %), a pure Ar gas (99.999% purity) and a hydrogen gas (99.99% purity) were introduced into the chamber as an atmosphere gas, the flow rates of the gases being adjusted to a ratio of Ar:N$_2$:H$_2$= 7:3:10, and the total pressure in the chamber being adjusted to 1.6 Pa by controlling the flow rates of the gases. The supplied power was 300 W at a discharge frequency of 13.56 MHz. The obtained AlSiN:H layer had the same refractive index as the AlSiN layer.

Finally, a metal reflecting layer of an Al-based alloy 45 nm thick was deposited by RF magnetron sputtering. The target was an Al-based alloy. Pure Ar gas (99.999% purity) was introduced into the chamber as an atmosphere gas and the inside pressure in the chamber was adjusted to 0.27 Pa by controlling the flow rate of the gas. The supplied power was 200 W at a discharge frequency of 13.56 MHz.

The thus obtained recording medium had a construction of PC/AlSiN (120 nm)/TbFeCo (20 nm)/AlSiN:H (50 nm)/Al-based alloy (45 nm).

The medium was subjected to recording and reproducing tests under the following conditions.

A magneto-optical recording and reproducing apparatus DDU-1000, sold by Pulse-Tec Industry, was used under the following conditions to measure the recording and reproducing characteristics of the medium: The conditions for recording were a disc rotation speed of 1800 rpm and 3600 rpm, a position of the recording track of 30 mm radius, recording frequencies of 3.7 MHz and 7.4 MHz (corresponding to 1800 rpm and 3600 rpm respectively), a magnetic field applied during recording of 250 Oe and a recording laser power of 2 to 9 mW. The conditions for reproducing were disc rotation speeds of 1800 rpm and 3600 rpm and a reproducing laser power of 1.5 mW.

The evaluation was made by comparing a recording laser power Pth required to obtain a C/N value of 10 dB (at disc a rotation speed 1800 rpm in Table) and a difference ΔPth between laser powers Pth at disc rotation speeds of 3600 rpm and 1800 rpm. Table 2 shows the results. Table 2 include the conditions for deposition the second dielectric layer, the refractive index of the second refractive index, Pth and ΔPth of the medium, the Si/Al ratio (x/y) determined by AES, and the percent content of N in the second dielectric layer excluding hydrogen (100–x–y).

Comparative Example 8

A magneto-optical recording medium was manufactured in the same manner as in Example 8 except that the second dielectric layer was an AlSiN layer. Thus, the medium had a construction of PC/AlSiN (120 nm)/TbFeCo (20 nm)/AlSiN (50 nm)/Al-based alloy (45 nm).

The evaluation of the medium was conducted in the same manner as in Example 8 and the results are shown in Table 2.

Example 9

A magneto-optical recording medium was manufactured in the same manner as in Example 8 except that the thickness of the metal reflecting layer was adjusted so as to obtain the same value (2.7 mW) of Pth as that of Comparative Example 8.

The evaluation of the medium was conducted in the same manner as in Example 8 and the results are shown in Table 2.

Examples 10 to 14

Magneto-optical recording media were manufactured in the same manner as in Example 8 except that the conditions for depositing the AlSiN:H layer were varied.

The evaluation of the media were conducted in the same manner as in Example 8 and the results are shown in Table 2.

Further, each of the same AlSiN:H layers as in Examples 10 and 13 was deposited on a Si single crystal substrate in a thickness of 70 nm and transmission FT-IR was analyzed with an FT-IR analyzer JIR40X, sold by Nippon Denshi, to determine the Si—H absorption around 2100 cm$^{-1}$ and the N—H absorption around 3300 cm$^{-1}$. These FT-IR absorptions and the estimated hydrogen contents in the layers obtained from the FT-IR absorptions are also shown in Table 2.

Table 2 shows that the recording sensitivity was improved since Pth in Example 8 was smaller than Pth in Comparative Example 8 by 0.38 mW. This is because the medium of Example 8 consumed the thermal energy from the applied laser beam more effectively to elevate the temperature of the magnetic recording layer than the medium of Comparative Example 8. This is an effect of the reduction of the thermal conductivity of the second dielectric layer by adding hydrogen to the AlSiN layer.

Further, in Examples 8 and 10 to 13, along with an increase in the Si/Al ratio, Pth and ΔPth decreased, indicating improved sensitivity and reduced dependency of the sensitivity on the disc rotation speed. These are effects of decrease in the thermal conductivity of the second dielectric layer by the increase in termination of atom bonding in the form of Si—H, caused by introduction of hydrogen to the layer and the relative increase in the amount of Si in the layer.

In Example 9, Pth was larger than that of Example 8 but ΔPth was smaller. In other words, the sensitivity was not improved but the dependency thereof on the disc rotation speed could be reduced.

In Example 14, when the hydrogen gas flow rate was reduced to lower the H content in the deposited AlSiN:H layer, the absorption by hydrogen bonds in FT-IR was reduced, the refractive index of the layer was increased and ΔPth increased, that is, the hydrogen content was lowered (to about 3 atom %) and the desired effects of the present invention were deminished. Thus, it is desired that the hydrogen content be more than 3 atom %, more preferably more than 5 atom %.

Thus, in Examples 8 to 14, a dielectric layer having a low thermal conductivity and being excellent in Kerr enhancement effect and durability and so on is obtained, and a magneto-optical recording medium using the above dielectric layer so as to have a reduced dependency of the recording sensitivity on the disc rotation speed can be provided.

Comparative Example 9

A magneto-optical recording medium was manufactured in the same manner as in Example 8. However, the conditions for depositing the second dielectric layer were varied to obtain the composition of AlSiN:H in which the content of hydrogen was above 40 atom %, outside the range of the present invention.

The evaluation of the medium was conducted in the same manner as in Example 8 and the results are shown in Table 2.

Table 2 shows that if the content of the hydrogen is too much, the mechanical strength of the layer is lowered and the layer may be peeled.

Comparative Example 10

A magneto-optical recording medium was manufactured in the same manner as in Example 8. However, the conditions for depositing the second dielectric layer were varied to obtain the composition of AlSiN:H in which the content of nitrogen in AlSiN, (100–x–y), was about 17 atom %, outside the range of the present invention.

The evaluation of the medium was conducted in the same manner as in Example 8 and the results are shown in Table 2.

It is seen in Table 2 that if the content of the nitrogen is too low, the refractive index increases and the light transmittance is lowered and the optical characteristics of the layer may be insufficient (reading the signal is difficult due to a lowered reflectivity).

TABLE 2

|  | Flow rate (cm$^3$/min) | | | Total pressure (Pa) | Refractive index | Pth (mW) | ΔPth (mW) | x/y | 100-x-y | H-bond absorption | Estimated H content (at %) |
| --- | --- | --- | --- | --- | --- | --- | --- | --- | --- | --- | --- |
|  | Ar | N$_2$ | H$_2$ |  |  |  |  |  |  |  |  |
| Example 8 | 27 | 3 | 30 | 1.6 | 2.04 | 2.32 | 1.07 | 3.27 | 26 |  |  |
| Example 9 | 27 | 3 | 30 | 1.6 | 2.04 | 2.70 | 1.01 | 3.27 | 26 |  |  |
| Example 10 | 27 | 3 | 20 | 1.6 | 2.08 | 2.49 | 1.14 | 2.53 | 37 | 0.0035 | 5 |
| Example 11 | 27 | 3 | 25 | 1.6 | 2.07 | 2.40 | 1.11 | 2.81 | 30 |  |  |
| Example 12 | 27 | 3 | 35 | 1.6 | 1.77 | 2.23 | 1.05 | 3.71 | 24 |  |  |
| Example 13 | 27 | 3 | 40 | 1.6 | 1.63 | 2.10 | 1.02 | 3.92 | 22 | 0.014 | 30 |
| Example 14 | 27 | 3 | 5 | 1.6 | 2.11 | 2.72 | 1.20 | 2.1 | 37 | 0.001 | 3 |
| Com. Ex. 8 | 49 | 21 | 0 | 0.73 | 2.04 | 2.70 | 1.28 | 1.76 | 37 |  |  |
| Com. Ex. 9 | 27 | 3 | 60 | 1.6 | 1.60 | — | — | 5.2 | 17 | 0.02 | >40 |
| Com. Ex. 10 | 27 | 1 | 20 | 1.6 | 2.24 | — | — | 5.2 | 17 | 0.007 | 18 |

Examples 15 to 21

Figure 2:
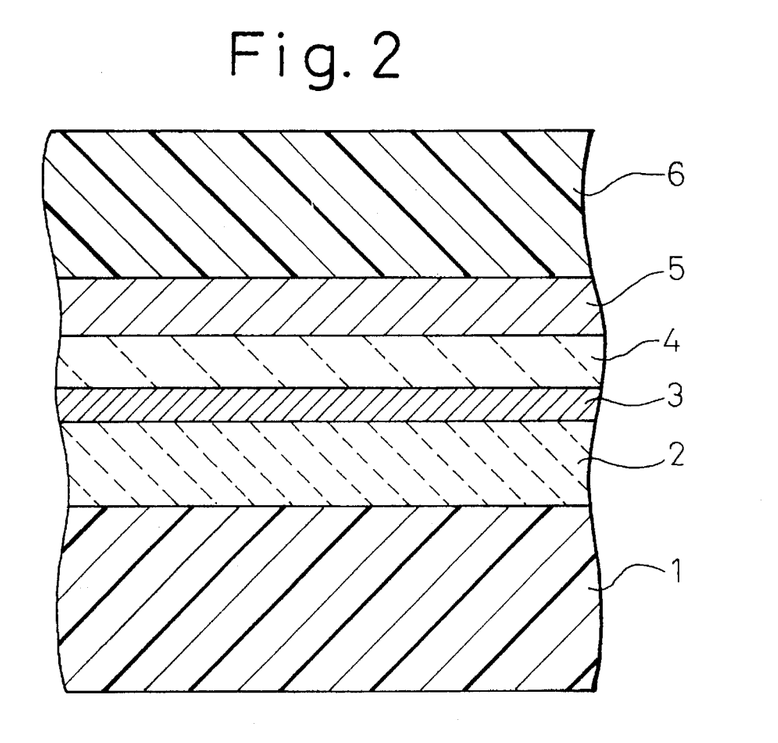
FIG. 2 shows a cross-section of another typical magneto-optical recording medium.

FIG. 2 shows a cross-section of a magneto-optical recording medium in accordance with the present invention, in which 1 denotes a transparent substrate with guides on the surface thereof, 2 a first dielectric layer, 3 a magneto-optical recording layer, 4 a second dielectric layer, 5 a metal reflecting layer and 6 an organic protecting layer. The second dielectric layer 4 has the role of suppressing the heat diffusion from the recording layer 3 to the metal reflecting layer 5.

In these Examples, an AlSiCN:H layer was used as the second dielectric layer 4.

A disc substrate of a polycarbonate resin (PC substrate) having a diameter of 90 mm and a thickness of 1.2 mm and provided with 1.6 μm pitch spiral grooves was mounted in a vacuum chamber of a magnetron sputtering apparatus in which three targets could be set (ANELVA SPF-430H-type). The vacuum chamber was preliminarily evacuated to an inside pressure of 53 μPa. The substrate was rotated at 15 rpm in the later deposition steps.

First, a first dielectric layer of AlSiN 110 nm thick was deposited by RF magnetron sputtering. The target was a disc of a sintered AlSi (30:70). A mixed gas of $Ar/N_2$ ($Ar:N_2=$ 70:30 in vol %) was introduced into the chamber as an atmosphere gas and the inside pressure in the chamber was adjusted to 0.6 Pa by controlling the flow rate of the gas. The supplied power was 400 W at a discharge frequency of 13.56 MHz.

Next, a magneto-optical recording layer of TbFeCo 25 nm thick was deposited by RF magnetron sputtering. The target was a magneto-optical-type TbFeCo alloy. Pure Ar gas (99.999% purity) was introduced into the chamber as an atmosphere gas and the inside pressure in the chamber was adjusted to 0.2 Pa by controlling the flow rate of the gas. The supplied power was 200 W at a discharge frequency of 13.56 MHz.

Next, a second dielectric layer of AlSiN:H 40 nm thick was deposited by RF magnetron sputtering. The target was returned to the same AlSi alloy as used for the first dielectric layer. A mixed gas of $Ar/N_2$ ($Ar:N_2$=70:30 in vol %), pure Ar gas (99.999% purity) and $CH_4$ gas were introduced into the chamber as atmosphere gases, the flow rates of the gases being adjusted to provide a desired composition of the deposited layer, the other conditions for deposition being the same as for the first dielectric layer. However, the pressure in the vacuum chamber was 0.6 Pa, the discharge power was 400 W, and a composite target of an AlSiN target with C chips mounted thereon was used to deposit a layer of AlSiCN:H.

Further, a metal reflecting layer of an Al-based alloy 60 nm thick was deposited by RF magnetron sputtering. The target was an AlAuTi alloy. Pure Ar gas (99.999% purity) was introduced into the chamber as an atmosphere gas and the inside pressure in the chamber was adjusted to 0.2 Pa by controlling the flow rate of the gas. The supplied power was 100 W at a discharge frequency of 13.56 MHz.

The thus obtained sample was removed from the sputtering apparatus and set in a spin coater, where the disc was rotated at 3000 rpm, a UV-curable phenolnovolakepoxyacrylate resin was coated on the disc and the disc was passed through a UV-ray irradiation apparatus to cure the resin. Thus, an organic protecting layer about 20 μm thick was provided on the metal reflecting layer. The UV-curable resin used was diluted with butyl alcohol to a viscosity of around 500 cP, to obtain a relatively thick coating of about 20 μm.

The thus obtained recording media were subjected to recording and reproducing tests.

A magneto-optical recording and reproducing apparatus DDU-1000, sold by Pulse-Tec Industry, was used under the following conditions to measure the recording and reproducing characteristics of the medium. The conditions for recording were disc rotation speeds of 1800 rpm and 3600 nm, a position of recording track of 30 mm radius, recording frequencies of 3.7 MHz and 7.4 MHz (corresponding to 1800 rpm and 3600 rpm respectively), a magnetic field applied during recording of 250 Oe and a recording laser power of 2 to 9 mW. The conditions for reproducing were disc rotation speeds of 1800 rpm and 3600 rpm and a reading laser power of 1.5 mW.

The evaluation was made by comparing a recording laser power Pth required to obtain a C/N value of 10 dB (at 1800 rpm in Table) and a difference ΔPth between laser powers Pth at disc rotation speeds of 3600 rpm and 1800 rpm. Table 3 shows the results. Table 3 includes the flow rates of gases while depositing the second dielectric layer, the refractive index of the second refractive index, the compositions of C, Al and Si, determined by AES, more specifically C/(C+Al+N), Al/(C+Al+N) and Si/(C+Al+N), and Pth and ΔPth of the medium.

Further, each of the same AlSiCN:H layers as in Examples 15 and 20 was deposited on a single crystal Si substrate to a thickness of 70 nm and transmission FT-IR was analyzed with a FT-IR analyzer JIR40X, sold by Nippon Denshi), to determine the Si—H absorption around 2100 $cm^{-1}$, N—H absorption around 3300 $cm^{-1}$ and C—H absorption around 2900 $cm^{-1}$. These FT-IR absorptions and the estimated hydrogen content in the layers obtained from the FT-IR absorptions are also shown in Table 3.

Comparative Examples 11 and 12

Magneto-optical recording media were manufactured in the same manner as in Example 15 except that the second dielectric layer was an AlSiN layer as in Example 11 and an AlSiCN layer in Example 12. The AlSiN layer as was deposited using the same target as that of the first dielectric layer in an atmosphere of a mixed gas of $Ar/N_2$ (70:30). The AlSiCN layer was deposited using a composite target of an AlSi target with C chips mounted thereon in an atmosphere of a mixed gas of $Ar/N_2$ (70:30).

The evaluation of the media was conducted in the same manner as in Example 15, and the results are shown in Table 3.

Comparative Example 13

The procedure of Example 20 was repeated except that the flow rate of $CH_4$ was 50 sccm. The obtained layer did not have sufficient strength and was peeled. The peeled layer was subjected to FT-IR measurement to have a total H-bonds absorption of 0.03, indicating that the estimated hydrogen content was above 40 atom %.

TABLE 3

| | Flow rate (ccm) | | | Refractive index | C % | Al % | Si % | Pth (mW) | ΔPth (mW) | H-bond absorption | Estimated H-content (at %) |
|---|---|---|---|---|---|---|---|---|---|---|---|
| | Ar | N₂ | CH₄ | | | | | | | | |
| Example 15 | 54 | 6 | 10 | 2.02 | 10 | 27 | 63 | 3.61 | 1.00 | | |
| Example 16 | 47 | 3 | 10 | 2.05 | 13 | 25 | 62 | 3.96 | 1.12 | | |
| Example 17 | 47 | 3 | 20 | 1.98 | 17 | 23 | 60 | 3.52 | 0.98 | 0.003 | 5 |
| Example 18 | 54 | 6 | 20 | 1.88 | 16 | 23 | 61 | 3.23 | 0.91 | | |
| Example 19 | 36 | 9 | 20 | 1.77 | 21 | 21 | 58 | 3.01 | 0.90 | | |
| Example 20 | 24 | 6 | 30 | 1.68 | 28 | 18 | 54 | 2.74 | 0.82 | 0.010 | 30 |
| Example 21 | 54 | 6 | 3 | 2.15 | 3 | 33 | 64 | 4.38 | 1.23 | 0.002 | 3 |
| Com. Exm. 11 | 49 | 21 | 0 | 2.05 | 0 | 34 | 66 | 4.86 | 1.41 | | |
| Com. Exm. 12 | 49 | 21 | 0 | 2.05 | 28 | 21 | 51 | 4.67 | 1.40 | | |
| Com. Exm. 13 | 24 | 6 | 50 | | | | | | | 0.03 | >40 |

*The layer was peeled.

Examples 22 to 27

FIG. 2 shows a cross-section of a magneto-optical recording medium in accordance with the present invention, in which 1 denotes a transparent substrate with guides on the surface thereof, 2 a first dielectric layer, 3 a magneto-optical recording layer, 4 a second dielectric layer, 5 a metal reflecting layer and 6 an organic protecting layer. The second dielectric layer 4 has a role of suppressing the heat diffusion from the recording layer 3 to the metal reflecting layer 5.

In these Examples, an AlSiCNO layer was used as the second dielectric layer 4.

A disc substrate of a polycarbonate resin (PC substrate) having a diameter of 130 mm and a thickness of 1.2 mm and provided with 1.6 μm pitch spiral grooves was mounted in a vacuum chamber of a magnetron sputtering apparatus in which three targets could be set (ANELVA SPF-430H-type). The vacuum chamber was preliminarily evacuated to an inside pressure of 53 μPa. The substrate was rotated at 15 rpm in the later deposition steps.

First, a first dielectric layer of AlSiN 110 nm thick was deposited by RF magnetron sputtering. The target was a disc of a sintered AlSi (30:70) having a diameter of 100 mm and a thickness of 5 mm. A mixed gas of Ar/N₂ (Ar:N₂=70:30 in vol %) was introduced into the chamber as an atmosphere gas and the inside pressure in the chamber was adjusted to 0.6 Pa by controlling the flow rate of the gas. The supplied power was 400 W at a discharge frequency of 13.56 MHz.

Next, a magneto-optical recording layer of TbFeCo 25 nm thick was deposited by RF magnetron sputtering. The target was a magneto-optical-type TbFeCo alloy. Pure Ar gas (99.999% purity) was introduced into the chamber as an atmosphere gas and the inside pressure in the chamber was adjusted to 0.2 Pa by controlling the flow rate of the gas. The supplied power was 200 W at a discharge frequency of 13.56 MHz.

Next, a second dielectric layer of AlSiNO 40 nm thick was deposited by RF magnetron sputtering. The target was returned to the same AlSi alloy as used for the first dielectric layer. A mixed gas of Ar/N₂ (Ar:N₂=70:30 in vol %), pure Ar gas (99.999% purity) and CO gas were introduced into the chamber as atmosphere gases, the flow rates of the gases being adjusted to provide a desired composition of the deposited layer, the other conditions for deposition being the same as for the first dielectric layer. However, the pressure in the vacuum chamber was 0.6 Pa, the discharge power was 400 W.

Further, a metal reflecting layer of an Al-based alloy 60 nm thick was deposited by RF magnetron sputtering. The target was an AlAuTi alloy. Pure Ar gas (99.999% purity) was introduced into the chamber as an atmosphere gas and the inside pressure in the chamber was adjusted to 0.2 Pa by controlling the flow rate of the gas. The supplied power was 100 W at a discharge frequency of 13.56 MHz.

The thus obtained sample was removed from the sputtering apparatus and set in a spin coater, where the disc was rotated at 3000 rpm, a UV-curable phenolnovolakepoxy-acrylate resin was coated on the disc and the disc was passed through a UV-ray irradiation apparatus to cure the resin. Thus, an organic protecting layer about 20 μm thick was provided on the metal reflecting layer. The UV-curable resin used was diluted with butyl alcohol to a viscosity of around 500 cP, to obtain a relatively thick coating of about 20 μm.

The thus obtained recording media were subjected to recording and reproducing tests. The medium mounted in an evaluation drive apparatus was rotated and evaluated at a radius of 30 mm at a linear speed of 7.5 m/sec. The recording was carried out by applying a DC laser light at 6.0 mW while an external magnetic field having a magnetic field of 100 Oe modulated with a frequency of 4.9 MHz was applied. The reproduction signal was then measured using a reproducing laser light having a power of 1.5 mW.

The recording sensitivity in the light modulated recording is defined as the laser power required to obtain a C/N ratio of 10 dB (hereinafter referred to as "Pth"), which was measured at a linear speed of 11.3 m/sec, a recording frequency of 7.4 MHz and an external magnetic field of 250 Oe. The recording and reproducing the magneto-optical recording medium was carried out by DDV-700, sold by Pulse-Tec Industry. An Auger electron spectrometer (SAM 610 manufactured by PHI) was used to analyze the composition of each layer, particularly the composition at the interface.

The results are shown in Table 4. Table 4 includes the flow rates of respective gases in sputtering to deposite the second dielectric layer, the compositions of C, Al and Si, determined by AES analysis, more specifically C/(C+Al+Si), Al/(C+Al+Si) and Si/(C+Al+Si), the ratios of N and O (in atom %), the intensity ratio ($I_{134eV}/I_{115eV}$) of Tb peaks at the interface between the recording layer and the second dielectric layer, the C/N ratio at an external magnetic field having a magnetic field of 100 Oe, and the recording laser power Pth.

Comparative Example 14

Example 22 was repeated except that the second dielectric layer was an AlSiN layer deposited by sputtering in a mixed gas of Ar/N₂ (N₂ 30 vol %) under the same corditions for the first dielectric layer.

The results are also included in Table 4.

TABLE 4

| | Ar ccm | N$_2$ ccm | Co ccm | C % | Al % | Si % | N atm % | O atm % | Ratio of peak intensity I$_{134eV}$/I$_{115eV}$ | C/N (dB) @ 100 Oe | Pth (mW) |
|---|---|---|---|---|---|---|---|---|---|---|---|
| Example 22 | 51 | 9 | 10 | 10 | 23 | 67 | 16 | 15 | 1.12 | 49.5 | 3.91 |
| Example 23 | 51 | 9 | 15 | 16 | 17 | 67 | 11 | 18 | 1.26 | 49.6 | 3.70 |
| Example 24 | 51 | 9 | 5 | 7 | 21 | 72 | 21 | 9 | 0.91 | 48.0 | 4.27 |
| Example 25 | 51 | 9 | 20 | 21 | 18 | 61 | 9 | 26 | 1.40 | 47.2 | 3.61 |
| Example 26 | 44 | 6 | 10 | 13 | 21 | 66 | 9 | 19 | 1.29 | 49.3 | 3.94 |
| Example 27 | 44 | 6 | 15 | 19 | 16 | 65 | 10 | 25 | 1.47 | 46.5 | 3.68 |
| Com. Ex. 11 | 49 | 21 | 0 | 0 | 34 | 66 | 35 | 0 | 0.66 | 43.1 | 4.86 |

We claim:

1. An optical recording medium comprising a transparent substrate, a first dielectric layer, a recording layer, a second dielectric layer and a reflecting layer stacked in this order, wherein said first dielectric layer is 40 to 140 nm thick and has a thermal conduction coefficient of 0.03 to 0.1 μW/K, said second dielectric layer is 10 to 60 nm thick and has a thermal conduction coefficient of 0.01 to 0.03 μW/K and said reflecting layer has a thermal conduction coefficient of 4 to 12 μW/K, where the thermal conduction coefficient is defined as a product of multiplying the thermal conductivity by the layer thickness, and wherein said reflecting layer comprises an alloy layer containing at least one element selected from the group consisting of Al, Au, Ag and Cu combined with up to 10 atom % of at least one element selected from the group consisting of Ti, Cr, Ta, Co, Ni, Mg and Si and said reflecting layer has a thermal conductivity of not less than 80 W/mK.

2. An optical recording medium according to claim 1, wherein said recording layer has a thermal conductivity of 5 to 20 W/mK.

3. An optical recording medium according to claim 1, wherein said recording layer is a magneto-optical recording layer.

4. An optical recording medium according to claim 1, wherein at least one of said first and second dielectric layers is made of an amorphous metal nitride comprising Al and Si and having bonds with hydrogen.

5. An optical recording medium according to claim 4, wherein said amorphous metal nitride is represented by the formula $(Si_xAl_yN_{100-x-y})_{100-a} \cdot H_a$ wherein $18 \leq 1.8y \leq x$, $55 \leq x+y \leq 80$ and $0 < a \leq 40$.

6. An optical recording medium according to claim 5, wherein $3 < a \leq 40$.

7. An optical recording medium according to claim 6, wherein $5 < a \leq 30$.

8. An optical recording medium according to claim 4, wherein said amorphous metal nitride further comprises carbon.

9. An optical recording medium according to claim 8, wherein said amorphous metal nitride is represented by the formula $(Si_xAl_yC_zN_{100-x-y-z})_{100-b} \cdot H_b$ wherein $18 \leq 1.8y \leq x$, $0 < z \leq 40$, $15 \leq (100-x-y-z) \leq 55$ and $0 < b \leq 40$.

10. An optical recording medium according to claim 9, wherein $3 < b \leq 40$.

11. An optical recording medium according to claim 10, wherein $5 < b \leq 30$.

12. An optical recording medium according to claim 1, wherein at least one of said first and second dielectric layer is made of an amorphous metal nitride comprising Si, Al and C.

13. An optical recording medium according to claim 12, wherein said amorphous metal nitride is represented by the formula $(Si_xAl_{100-x})_uC_vN_wO_{100-u-v-w}$ wherein $0 < x \leq$, $20 \leq u$, $0 < v \leq 30$, and $0 < (100-u-v-w)$.

14. An optical recording medium according to claim 12, wherein said recording layer comprises Tb and the peak intensities of Tb at the interface between said recording layer and said second dielectric layer at 134 eV and 115 eV in Auger electron spectrometry have a ratio of $I_{134eV}/I_{115eV}$ of 0.8 to 2.0.

15. An optical recording medium comprising a transparent substrate, a first dielectric layer, a recording layer, a second dielectric layer and a reflecting layer stacked in this order, wherein said first dielectric layer is 40 to 140 nm thick and has a thermal conduction coefficient of 0.03 to 0.1 μW/K, said second dielectric layer is 10 to 60 nm thick and has a thermal conduction coefficient of 0.01 to 0.03 μW/K and said reflecting layer has a thermal conduction coefficient of 4 to 12 μW/K, where the thermal conduction coefficient is defined as a product of multiplying the thermal conductivity by the layer thickness, and wherein said reflecting layer comprises a multi-layer containing at least one element selected from the group consisting of Al, Au, Ag and Cu combined with up to 10 atom % of at least one element selected from the group consisting of Ti, Cr, Ta, Co, Ni, Mg and Si and said reflecting layer has a thermal conductivity of not less than 80 W/mK.

16. A magneto-optical recording medium comprising a transparent substrate, a first dielectric layer 40 to 140 nm thick, a recording layer, a second dielectric layer 10 to 60 nm thick and a reflecting layer stacked in this order, wherein said first dielectric layer has a thermal conduction coefficient of 0.03 to 0.1 μW/K, said second dielectric layer has a thermal conduction coefficient of 0.01 to 0.03 μW/K, where the thermal conduction coefficient is defined as a product of multiplying the thermal conductivity by the layer thickness and wherein said first and said second dielectric layers are made of one of an amorphous metal nitride comprising Al and Si and having bonds with hydrogen, an amorphous metal nitride comprising Al, Si and C and having bonds with hydrogen, and an amorphous metal nitride comprising Al, Si and C, and wherein said reflecting layer comprises an alloy layer or a multi-layer containing at least one element selected from the group consisting of Al, Au, Ag and Cu combined with up to 10 atom % of at least one element selected from the group consisting of Ti, Cr, Ta, Co, Ni, Mg and Si and wherein said reflecting layer has a thermal conductivity of not less than 80 W/mK.

17. A magneto-optical recording medium according to claim 16, wherein said amorphous metal nitride is represented by the formula $(Si_xAl_yN_{100-x-y})_{100-a} \cdot H_a$ wherein $18 \leq 1.8y \leq x$, $55 \leq x+y \leq 80$ and $0 < a \leq 40$.

18. A magneto-optical recording medium according to claim 17, wherein $3 < a \leq 40$.

19. A magneto-optical recording medium according to claim 18, wherein $5 < a \leq 30$.

20. A magneto-optical recording medium according to claim 16, wherein said amorphous metal nitride is represented by the formula $(Si_xAl_yC_zN_{100-x-y-z})_{100-b} \cdot H_b$ wherein $18 \leq 1.8y \leq x$, $0 < z \leq 40$, $15 \leq (100-x-y-z) \leq 55$ and $0 < b \leq 40$.

21. A magneto-optical recording medium according to claim 20, wherein $3 < b \leq 40$.

22. A magneto-optical recording medium according to claim 21, wherein $5 < b \leq 30$.

23. A magneto-optical recording medium according to claim 16, wherein said magneto-optical recording layer is a magnetic layer having an easy magnetization axis vertical to said magneto-optical recording layer.

24. A magneto-opticla recording medium according to claim 16, wherein at least one of said first and second dielectric layer is made of an amorphous metal nitride comprising Si, Al and C.

25. A magneto-optical recording medium according to claim 24, wherein said amorphous metal nitride is represented by the fourmula $(Si_xAl_{100-x})_uC_vN_wO_{100-u-v-w}$ wherein $0 < x \leq 50$, $20 \leq u$, $0 < v \leq 30$ and $0 < (100-u-v-w)$.

26. A magneto-optical recording medium according to claim 24, wherein said recording layer compises Tb and the peak intensities of Tb at the interface between said recording layer and said second dielectric layer at 134 eV and 115 eV in Auger electron spectrometry have a ratio of $I_{134eV}/I_{115eV}$ of 0.8 to 2.0.

27. A magneto-optical recording medium according to claim 16, wherein said recording layer has a thermal conductivity of 5 to 20 W/mK.

* * * * *